Dec. 1, 1953 G. A. THOMPSON 2,660,724
PORTABLE HAMMERING MACHINE
Filed July 20, 1950 2 Sheets-Sheet 1
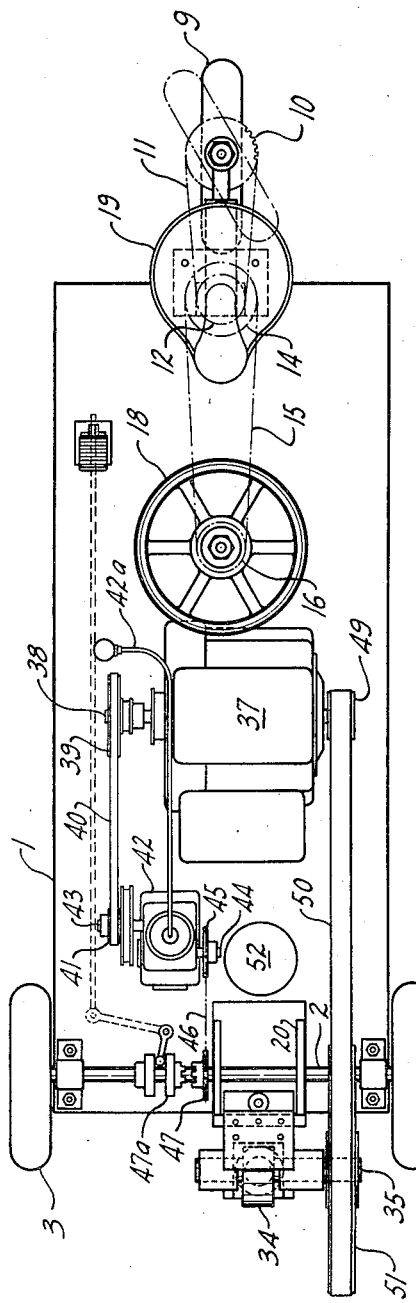
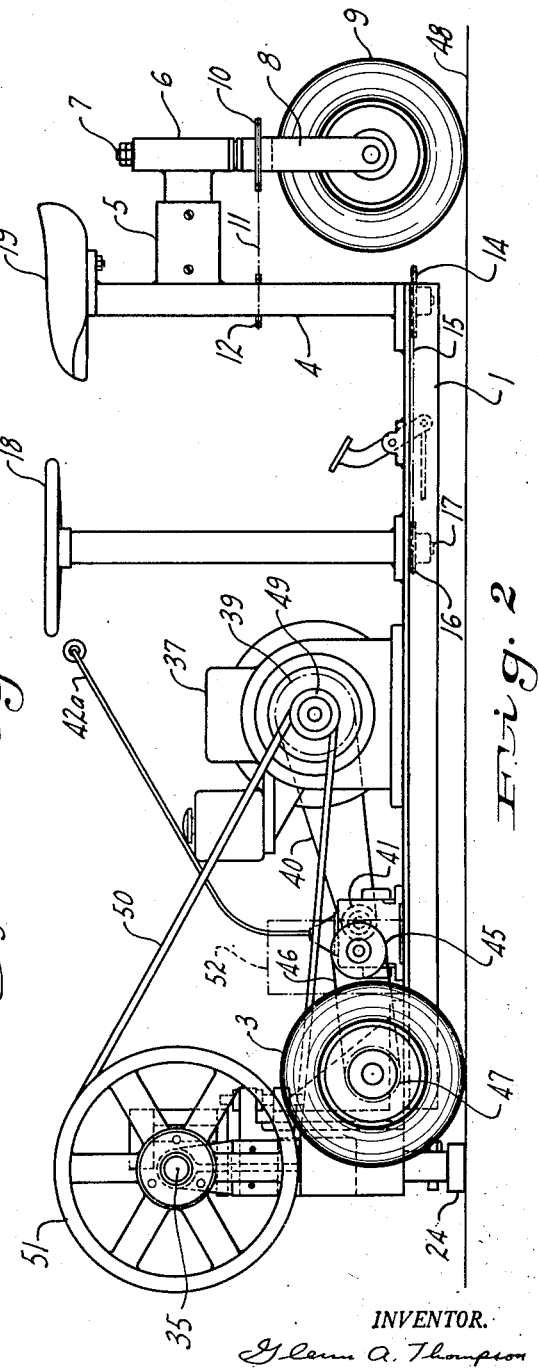
INVENTOR.
Glenn A. Thompson
BY William B. Jaspert
Attorney.

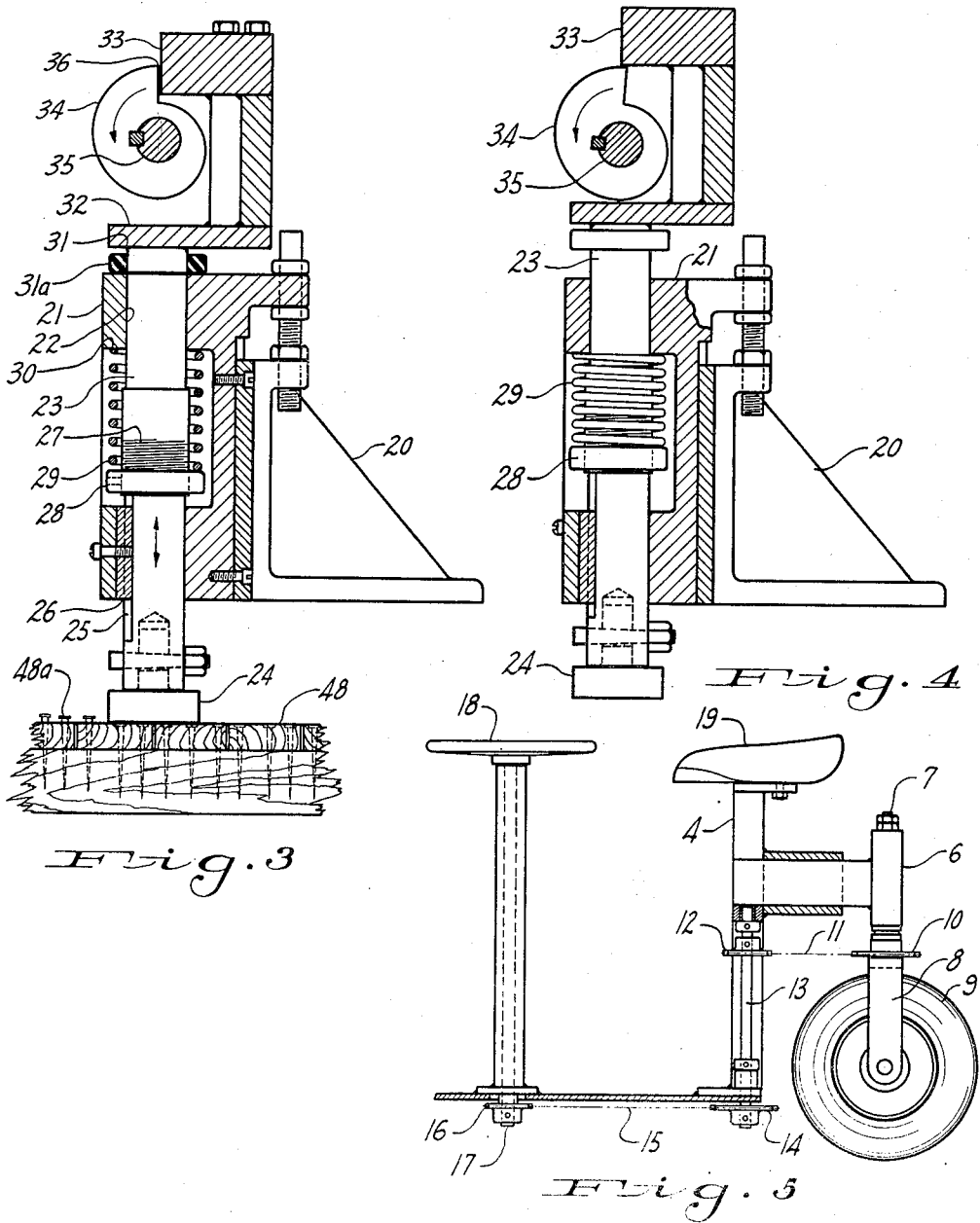

Patented Dec. 1, 1953

2,660,724

UNITED STATES PATENT OFFICE 2,660,724

PORTABLE HAMMERING MACHINE

Glenn A. Thompson, Pittsburgh, Pa.

Application July 20, 1950, Serial No. 174,901

2 Claims. (Cl. 1—1)

This invention relates to new and useful improvements in hammering machines, more particularly for a portable hammer for nailing boardwalks and the like, and it is among the objects thereof to provide apparatus, for hammering rows of nails, which advances over boardwalks having nail heads protruding thereon, at regulated speeds coordinated with the reciprocatory movement of a hammer to subject each nail of rows of nails to a multiple of hammer blows while the machine is traveling thereover.

It is a further object of the invention to provide a self-propelled hammering machine of simple and durable mechanical construction and in which the propelling mechanism is adjustable in speed and the apparatus is suitably counterweighted and balanced to provide a smooth hammering action.

The invention will become more apparent from a consideration of the accompanying drawings, constituting a part hereof, in which like reference characters designate like parts, and in which:

Fig. 1 is a top plan view of a nail hammering machine embodying the principles of this invention;

Fig. 2, a side elevational view thereof;

Fig. 3, a vertical cross-sectional view of a hammer mounted on the machine shown in Figs. 1 and 2;

Fig. 4, a similar view; and

Fig. 5, a side elevational view, partially in section, of the steering mechanism of the machine.

With reference to the several figures of the drawings, numeral 1 designates a chassis having a wheeled axle 2 with pneumatic tires 3. The rear of the chassis is provided with an upright 4 having an arm 5 with a swivel bearing 6 for journaling a shaft 7 of a wheel bracket 8 in which is mounted a pneumatic tired wheel 9. Bracket 8 is subjected to swivel movement by a sprocket wheel 10 connected by a chain 11 to a sprocket wheel 12 mounted on shaft 13, more clearly shown in Fig. 5 of the drawings, shaft 13 being provided with a sprocket wheel 14 that is connected by a chain 15 to a sprocket wheel 16 of a steering column 17 having a hand wheel 18 mounted thereon. A seat 19 is mounted on top of the upright 4.

Mounted on the front of the chassis 1 is a bracket 20 that carries a block 21 having a cylindrical bore 22 for receiving the shank 23 on the end of which is mounted the head 24 of a hammer. Shank 23 is slotted, as shown at 25, for receiving a key 26 to prevent it from rotating but to permit free axial movement in the block 21. Shank 23 is provided with a threaded portion 27 for receiving a threaded collar 28 that is adjustable thereon and which constitutes a seat for a coil spring 29, one end of which abuts at the shoulder 30 of the block 21. By adjusting collar 28 the tension on spring 29 is varied in accordance with the force of impact desired on head 24. Shank 23 is normally biased in a downward direction by the coil spring 29. The upper end of the shank 23 is welded as indicated at 31 to a bracket 32 that carries a cam shoe 33 contacting the cam 34 mounted on shaft 35, the rotation of which is in a counterclockwise direction, as shown by the arrow. As the cam revolves the shoe rides on the cam surface until it hits the high point of the cam, as designated by the numeral 36, when it drops off in the manner shown in Fig. 3 of the drawing. The shoe 33 is shown on the rise of the cam in Fig. 4 of the drawing, in which position the coil spring 39 is compressed as shown, and after the shoe drops to the low point of the cam, the force of the spring subjects the hammer head 24 to an impact blow in a downward direction.

Referring to Figs. 1 and 2 of the drawings, an engine, such as a gasoline engine, designated by the numeral 37, is mounted on the chassis, said engine having its shaft 38 extending at both ends. A pulley 39 is mounted on one end of shaft 38 for connection by a belt 40 with a pulley 41 of a combined gear reduction and transmission unit 42 which is of conventional form and constitutes no part of the present invention. Pulleys 39 and 41 are double pulleys, as shown, to vary the speed ratio of the transmission shaft 43 and the engine shaft 38, if that is desirable. The gear reduction and transmission mechanism is provided with a drive shaft 44 having a sprocket wheel 45 connected by a sprocket chain 46 to sprocket wheel 47 mounted on shaft 2 to subject the latter to rotary movement for propelling the vehicle on a supporting surface as indicated by the numeral 48 in Fig. 2 of the drawings, such, for example, as a boardwalk, so indicated by the numeral 48 in Fig. 3 of the drawings. A conventional foot operated clutch 47a slidably mounted on shaft 2 connects the sheave wheel 47 which freely rotates on shaft 2 to thereby drive the shaft 2 to impel the vehicle.

The shaft 38 of engine 37 is also provided with a pulley 49 connected by a belt 50 to a wheel 51 which is of a design to effect a flywheel action for driving the hammer mechanism shown in Fig. 3. Wheel 51 is supported on the cam shaft 35 in the manner explained in connection with the description of Figs. 3 and 4 of the drawings, to subject the hammer head 24 to reciprocable movement vertically. To stabilize the machine and counteract the severe impact blows of the hammer 24, a counterweight, designated by the numeral 52, is mounted on the chassis 1 behind the hammer, the counterweight being shown in outline in Fig. 2 of the drawings, and in practice is about 100 pounds or more.

The operation of the above described hammering machine is briefly as follows:

With the clutch 47a disengaged from the sheave wheel 47 and with the gear shaft 42a in neutral, the engine 37 is energized which subjects the flywheel 51 to rotation and operates the hammer 24. The operator then manipulates the gear shift 42a to the desired speed and effects engagement of the clutch 47a with the sheave wheel 47, causing the vehicle to propel itself over the supporting surface 48. The operator by steering the wheel 18 causes the rear wheel 9 to swivel in the manner shown in dotted lines in Fig. 1 to steer the vehicle and the hammer head 24 subjects the nails, designated by the numeral 48a, to impact blows to drive them in the manner shown in Fig. 3.

The device is especially designed for driving nails on boardwalks at seashore resorts and the like, which, when subjected to rain, are caused to swell, lifting the nails with them. When they are again dried out, the wood recedes or shrinks but the nails stay in their lifted position as shown at the left of Fig. 3. Heretofore it has required the services of many carpenters to drive the nails back in position at a tremendous cost. By use of the machine, all of the nails of a large boardwalk can be replaced in a matter of hours by a single operator, which took many men days and weeks to accomplish.

By coordinating the speed of the vehicle with the reciprocatory movement of the hammer head 24, each nail in a row of nails is subjected to three or four impacts as the vehicle passes thereover. In this manner the machine need not be of a capacity to drive a nail or spike by a single blow. The number of blows to which the rows of nails are subjected is determined by the spacing of the nails and the speed at which the vehicle is propelled relative to the hammer blows as controlled by the gear reduction and transmission mechanism 42, which is set by the operator. Because of the severeness of the impacts of the hammer blows 24, a cushioning pad of rubber or fabric, designated by the numeral 31a, may be interposed between the bracket 32 and the block 21. Pad 31a is loosely fitted around shaft 23 to rest on block 21.

It is apparent from the above description of the invention that a hammer machine made in accordance therewith is a great labor saving device and is capable of efficiently and effectively re-hammering nails on boardwalks in a minimum length of time to render them more useful and to reduce the annoyance of the sound of hammer blows to a minimum.

Although one embodiment of the invention has been herein illustrated and described, it will be evident to those skilled in the art that various modifications may be made in the details of construction without departing from the principles herein set forth.

I claim:

1. A hammering machine for renailing nails on boardwalks comprising a mobile chassis having a wheeled axle adjacent one end and having an outboard steering wheel supporting the other end, a seat mounted adjacent said steering wheel at the extreme end of the chassis having a bracket for mounting the steering wheel thereon, a hammer mounted above the wheeled axle and extending beyond the end frame of the chassis opposite the seating end thereof, a counterweight mounted on said chassis on the side opposite the hammer to counteract the hammer blows, a prime mover and transmission, a drive mechanism connecting the wheeled axle with said prime mover and a drive mechanism for actuating the hammer, said first-named drive mechanism including a variable speed transmission for varying the speeds of the axle to regulate the number of blows of the hammer to the rate of travel of the chassis.

2. A movable hammer carriage comprising a dirigible wheeled chassis, a drive mechanism therefor, a hammer comprising a U-shaped block bracketed on said carriage, a shank mounted for vertical reciprocatory movement in said block, said shank being slotted and said block having a key for sliding engagement with said slot, a spring normally urging the shank to a down position, said spring being disposed around said shank between the U-legs of said block, one end of said spring abutting one of said legs, an adjustable collar on said shank comprising a seat for the other end of said spring to vary the compression of the spring, a shoe formed integrally with the top of the shank and a hammer head at the other end of the shank, said shoe having an offset constituting a cam follower, cam means engaging the offset portion of the shoe for lifting the hammer against the tension of the spring, said cam means comprising a cam having a uniform rise through an angle of 360° terminating in a radial shoulder constituting a drop to the low position of the cam, said cam shoe offset extending to the center of the cam, and cushioning means around said shank disposed between the block and shoe to absorb the shock of the hammer blows.

GLENN A. THOMPSON.

References Cited in the file of this patent

UNITED STATES PATENTS

| Number | Name | Date |
| --- | --- | --- |
| 1,060,377 | Stutzer | Apr. 29, 1913 |
| 1,312,518 | Clark | Aug. 12, 1919 |
| 1,509,492 | Schaub | Sept. 23, 1924 |
| 1,654,014 | Proctor et al. | Dec. 27, 1927 |
| 1,684,882 | Penote | Sept. 18, 1928 |
| 2,033,516 | Drypolcher | Mar. 10, 1936 |
| 2,098,895 | Velten | Nov. 9, 1937 |
| 2,234,831 | Porter | Mar. 11, 1941 |
| 2,457,984 | Dougherty | Jan. 4, 1949 |